(12) United States Patent
Lansing, Jr. et al.

(10) Patent No.: US 10,340,693 B2
(45) Date of Patent: Jul. 2, 2019

(54) SYSTEMS AND METHODS FOR GENERATING ENERGY USING A HYDROGEN CYCLE

(71) Applicants: Lawrence D. Lansing, Jr., Kingsland, TX (US); Lawrence D. Lansing, Kingsland, TX (US)

(72) Inventors: Lawrence D. Lansing, Jr., Kingsland, TX (US); Lawrence D. Lansing, Kingsland, TX (US)

( * ) Notice: Subject to any disclaimer, the term of this patent is extended or adjusted under 35 U.S.C. 154(b) by 0 days.

(21) Appl. No.: 15/906,713

(22) Filed: Feb. 27, 2018

(65) Prior Publication Data

US 2018/0287387 A1 Oct. 4, 2018

Related U.S. Application Data

(63) Continuation of application No. 14/775,529, filed as application No. PCT/US2014/025298 on Mar. 13, 2014, now abandoned.

(Continued)

(51) Int. Cl.
| | |
|---|---|
| *H02J 3/28* | (2006.01) |
| *H02S 10/12* | (2014.01) |
| *F03D 9/11* | (2016.01) |
| *F03D 9/00* | (2016.01) |
| *F03B 13/26* | (2006.01) |
| *G05B 15/02* | (2006.01) |

(Continued)

(52) U.S. Cl.
CPC ............... *H02J 3/28* (2013.01); *F03B 13/26* (2013.01); *F03D 9/007* (2013.01); *F03D 9/11* (2016.05); *F03D 9/19* (2016.05); *F03D 9/257* (2017.02); *G05B 15/02* (2013.01); *H02S 10/12* (2014.12); *F05B 2260/42* (2013.01); *Y02E 10/28* (2013.01); *Y02E 10/38* (2013.01); *Y02E 10/72* (2013.01); *Y02E 10/725* (2013.01); *Y02E 50/12* (2013.01); *Y02P 80/158* (2015.11); *Y02P 90/50* (2015.11)

(58) Field of Classification Search
CPC ............... F03D 9/19; F03D 9/257; H02J 3/28
USPC ...... 307/64–68, 43–50; 290/55, 54, 52, 1 R; 60/508–515
See application file for complete search history.

(56) References Cited

U.S. PATENT DOCUMENTS

| | | | | |
|---|---|---|---|---|
| 5,592,028 A | * | 1/1997 | Pritchard | .................. C25B 1/04 290/55 |
| 2006/0279088 A1 | * | 12/2006 | Miller | .................. F03D 7/0284 290/44 |
| 2011/0169269 A1 | * | 7/2011 | Devine | .................. F17C 3/025 290/55 |

* cited by examiner

*Primary Examiner* — Tomi Skibinski
(74) *Attorney, Agent, or Firm* — The Law Firm of H. Dale Langley, Jr., P.C.

(57) ABSTRACT

Systems and methods for continuously generating electric power using a renewable energy power source to continuously generate electrical energy are disclosed. An illustrative embodiment includes transmitting electrical power from the renewable energy power source to an electrolyzer to produce hydrogen gas, storing the hydrogen gas in a storage facility until production of power from the renewable energy power source drops below a predetermined threshold, and activating a secondary power generation system that converts the stored hydrogen to electrical energy. The stored hydrogen may be converted to electrical energy using a gas turbine generator or a fuel cell. The system further includes a reverse osmosis subsystem for purifying water for use in the electrolyzer and optional systems for providing the purified water to a community and for using the produced electricity to treat waste water to generate treated water that may be purified and supplied to the electrolyzer.

19 Claims, 4 Drawing Sheets

Related U.S. Application Data

(60) Provisional application No. 61/780,101, filed on Mar. 13, 2013.

(51) Int. Cl.
*F03D 9/25* (2016.01)
*F03D 9/19* (2016.01)

FIG. 4

SYSTEMS AND METHODS FOR GENERATING ENERGY USING A HYDROGEN CYCLE

TECHNICAL FIELD

The present invention generally relates to a large-scale renewable energy production processes that use a renewable energy source for generating hydrogen gas that may subsequently be used in a gas-turbine power generation system that is co-operated with the renewable energy source.

BACKGROUND

While there is a desire on the part of many consumers to acquire their energy needs solely from a renewable energy source, such as wind energy or solar power, these energy sources may be lacking in cost-effectiveness and reliability due to the presence of inefficiencies in power existing production systems or natural variations in the availability of sunlight and wind for power production.

BRIEF DESCRIPTION OF THE DRAWINGS

Illustrative embodiments are described in detail below with reference to the attached drawing figures, which are incorporated by reference herein and wherein.

The illustrated figures are only exemplary and are not intended to assert or imply any limitation with regard to the environment, architecture, design, or process in which different embodiments may be implemented.

DETAILED DESCRIPTION

In the following detailed description of the illustrative, non-limiting embodiments, reference is made to the accompanying drawings that form a part hereof. These illustrative embodiments are described in sufficient detail to enable those skilled in the art to practice the invention. It is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is not to be taken in a limiting sense, and the scope of the illustrative embodiments is defined only by the appended claims.

According to an illustrative embodiment, a process for producing and applying renewable energy incorporates at least three technologies: renewable power such as (for example) solar power and wind power, gas turbine power, and hydrogen electrolyzers. None of the three technologies is capable on its own of providing continuous power while using only renewable energy sources. For example, most gas turbines burn natural gas, and most renewable energy is derived from non-constant energy sources such as wind, sun, or tides. With this process, a stable and continuous source of power can be guaranteed to a specific user or the grid with zero carbon emissions and using only renewable energy to drive the system.

The current electrical grid is set up to rely on continuous power and does not respond well to dips and major fluctuations in demand. Further, recent government mandates in the U.S. and in other countries call for increasing percentages electric power to be provided to the grid from renewable sources. Many renewable sources, however, are inherently unstable sources of electricity. According to the illustrative embodiments, systems and methods that involve a renewable energy, hydrogen cycle system are disclosed that reduce instability typically associated with renewable energy sources (also referred to as "renewables") and provide clean power at competitive whole sale rates without interruption.

Figure 1:
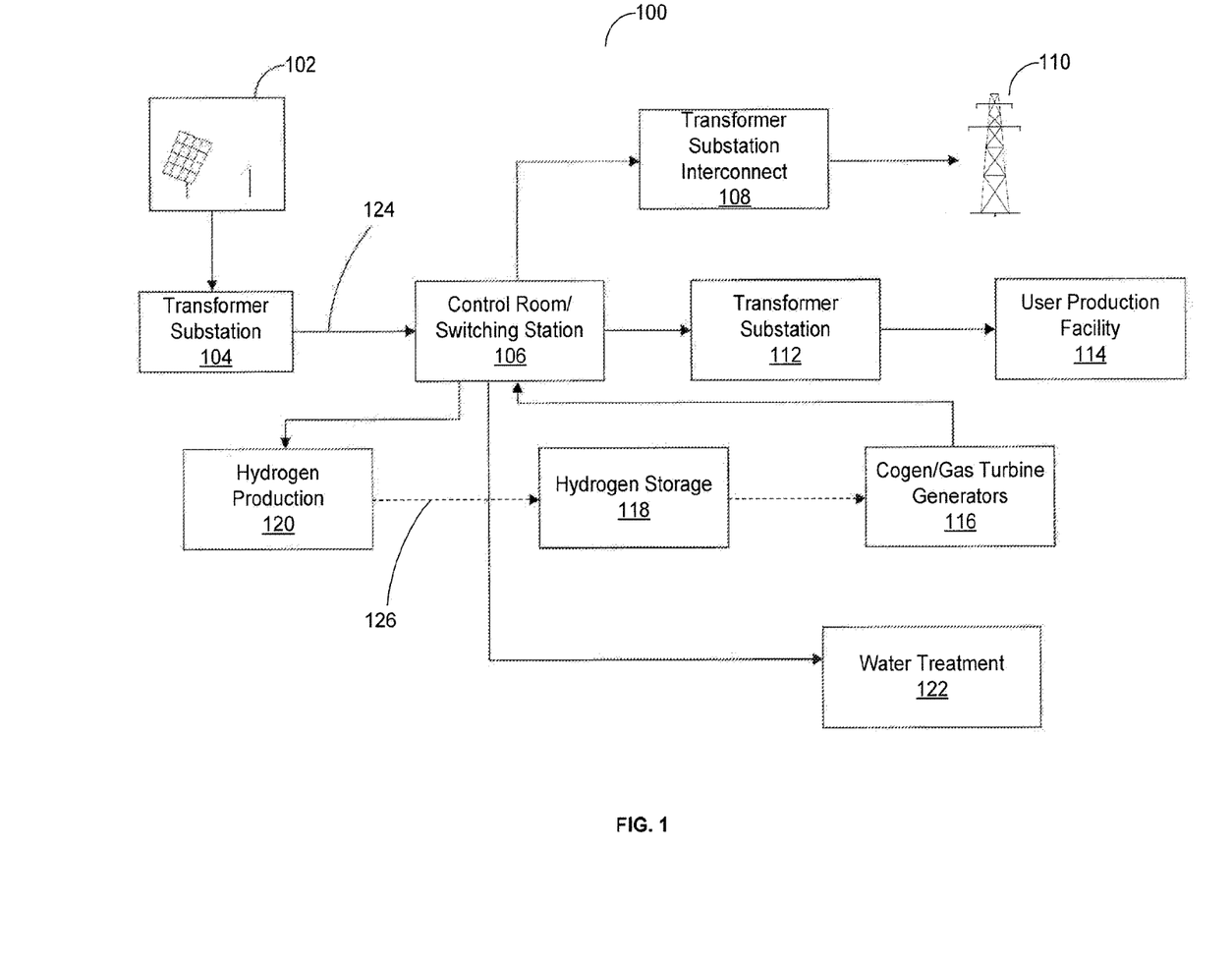
FIG. 1 is a block diagram showing a system and related processes for generating renewable energy and hydrogen gas, and using the renewable energy and hydrogen gas to generate electric power.

Referring now to the figures, an illustrative system is described with regard to FIG. 1. As shown in FIG. 1, in illustrative system for producing continuous electric power from renewables 100 includes a renewable energy source 102. The renewable energy source 102 may be any suitable renewable energy source, including without limitation a wind farm, a solar panel farm, or a tidal hydroelectric generator. The renewable energy source 102 generates electric power when energy is available. For example, in the case of solar power, solar energy is available when the sun provides light of a sufficient magnitude that makes it efficient to produce electric power using solar panels. Similarly, wind energy may be extracted from the atmosphere when the wind blows at a sufficient magnitude to power a windmill or wind turbine. Hydroelectric generators powered by title energy may similarly extract energy from ocean tides as the sea level rises and falls at the site of the generators. Energy harvested from the renewable energy source 102 is transmitted to a transformer substation 104 for conversion to an appropriate voltage, and the transformed electricity 124 is conveyed to a control room or switching station 106. During times of peak energy production or when adequate energy is stored in other parts of the system, the electric energy is provided to a transformer substation interconnect 108 and supplied to the public for use via a grid 110. Alternatively, the energy may be transmitted to an alternate transformer substation 112 and stored at or provided to a user production facility 114 for use at the site of the system 100.

An embodiment, the electric energy may also be provided from the control room/switching station 106 to an on-site (optional) water treatment system 122 and to a hydrogen production system 120. In an embodiment, the system 100 uses purified water to operate efficiently, therefore the system may include mechanisms for treating wastewater, sea water, or well water for use as feed water in an electrolyzer. According to an illustrative embodiment, if a domestic water source is needed in the vicinity of the plant, the system may include a reverse osmosis system that can be scaled to supply domestic need for water in the community. As referenced herein, a "community" is generally understood to be a community that is served by a commercial, military, or industrial power producer, such as a village, a city, a military base, or an industrial plant, such as a manufacturing facility.

Energy provided to the hydrogen production system 120 may be provided directly to the hydrogen production system 120 and used to produce hydrogen 126 and oxygen from a water source using electrolysis. In an embodiment, the provided energy may be transmitted directly to the hydrogen production system 120 without the use of batteries as a storage medium. The produced hydrogen 126 is conveyed to a hydrogen storage system 118, and may subsequently be supplied to a gas turbine power generation system, such as the cogeneration system 116, which is described in more detail with regard to FIG. 2. When it is not optimal to produce power from renewables because, for example, the sun is down, the tide is not changing, or there is no wind, the system 100 pieces ceases using renewable power to supply energy to the grid and activates or increases power generation from the cogeneration system 116. When the cogeneration system 116 is activated, hydrogen 126 that was created and stored during time periods in which there is an overabundance of renewable energy is supplied to the cogeneration system 116 to efficiently generate electric power that is subsequently supplied to the control room/switching station 106 and distributed to the user production facility 114 or to the grid 110, as described above.

In an illustrative embodiment, to provide continuous 24 hour power with renewable variable energy, the system 100 uses hydrogen as a storage mechanism to store excess energy generated from the renewable energy source 102. As noted, hydrogen is created through electrolysis where electricity from the renewable energy source 102 is used to break water into its component hydrogen and oxygen atoms. The stored energy in the form of hydrogen is then burned in gas turbines of the cogeneration system 116 to produce electricity when the renewable energy source is nonfunctional. In an embodiment, the system 100 is also capable of producing domestic water and potentially reclaiming wastewater as well. As such, the system has the ability to provide power, purified fresh water, and water treatment.

The renewable energy source 102 may be a non-constant, renewable energy power generator. Any source or combination of renewable energy may be used, including wind, solar, tidal, or any other as yet unknown method of harvesting energy from renewables that produces variable electric power. More stable forms of renewable energy, such as hydropower and geothermal power, may also be used.

In an embodiment in which the renewable energy source 102 is a wind farm, the wind farm may include utility scale windmills or wind turbines with attached generators to produce power. Companies such as Siemens and G.E. make wind turbines suitable to utility scale applications. 500 KW wind turbines or smaller may be used for low demand applications and 10 MW or higher out wind turbines may be used for high demand applications. The Wind Farm is sized using two factors, energy demand, and productivity. Demand on the farm is created from three sources: the hydrogen production system 120 that uses electricity to store energy as generated hydrogen, electricity provided to end users via the user production facility 114, and electricity sales to the grid 110. Productivity is generally expressed as the average amount of wind that the farm receives in a given month.

In an embodiment in which the renewable energy source 102 is a solar field, field may include either concentrated photovoltaic (CPV) or thermal voltaic (TPV) solar arrays. As referenced herein, a concentrated photovoltaic array is an array made up of solar panels that magnify and concentrate solar radiation at a focal point where it can be absorbed and converted to electricity. Similarly, a thermal voltaic solar array is an array made up of solar panels that absorb radiant energy from the sun and convert it to electricity. In an embodiment, the solar field includes double axis trackers, such as those developed by MST to their increase the efficiency of the array. It is noted that CPV arrays are suitable for areas that receive intense sunlight where cloud cover and inclement weather is minimal. Generally, CPV technology reduces the land area used for energy production to an estimated 2.5 to 2.96 acres per megawatt (MW), depending on topography. TPV is better suited for non-optimal solar locations having higher average cloud cover. TPV usage, however, make way to a larger footprint for the solar field, at approximately 3.6 acres per MW. At any rate, the size of the solar field is determined by two factors: energy demand and the expected amount of sunlight (weather). Again, demand on the solar field may be created from three sources: the hydrogen production system 120, the user production facility 114, and the grid 110.

Water can be used as a hydroelectric power source in a variety of ways that would facilitate system operations. In addition, ground water, sea water, domestic water, and even reclaimed water can all be used as a primary source for both cooling and hydrogen feed water. In an embodiment, all water, regardless of its source, may be processed through a reverse osmosis facility to remove any impurities that might damage system equipment. In the event a domestic water supply is used, for example, all chlorine and fluorine are removed prior to usage to prevent damage to membranes in the reverse osmosis facility.

The system 100 plant can be designed to address a community's power and water demands. For example, the reverse osmosis plant can be sized to include domestic water production as well as water for all electrolysis and cooling for all portions of the system 100. In the event that domestic water is needed additional water storage may also be taken into account.

Figure 3:
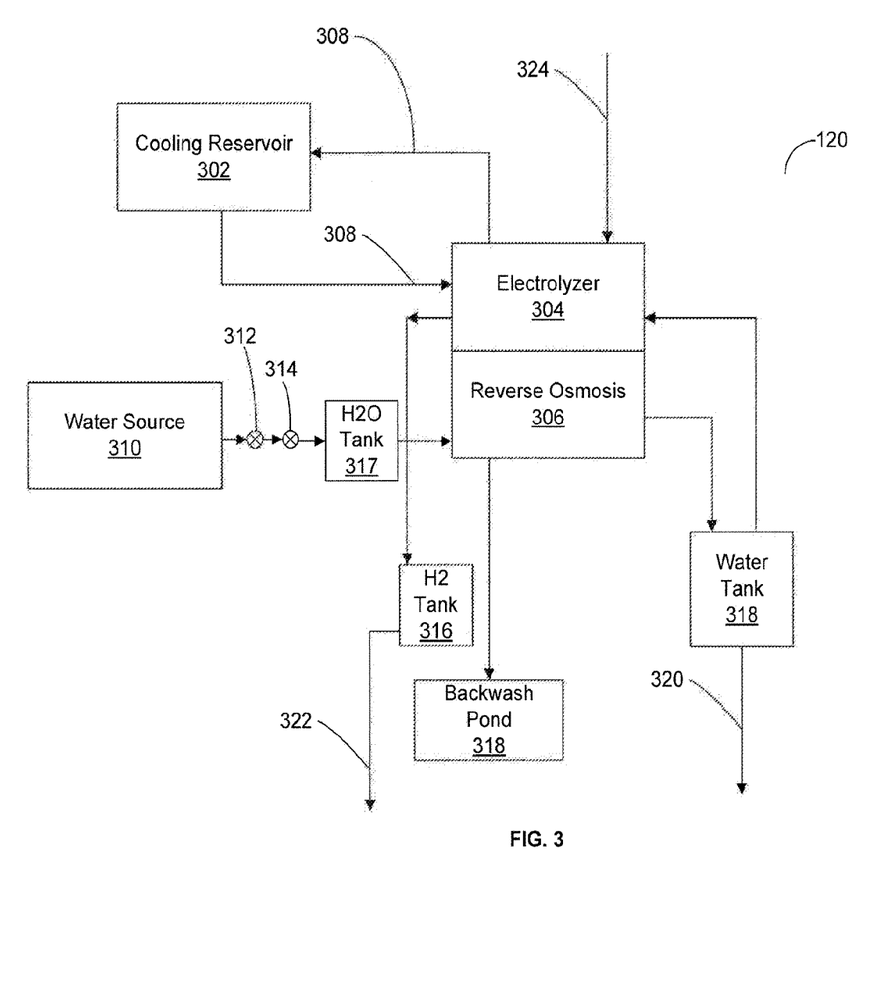
FIG. 3 is a block diagram showing a hydrogen production and water purification system that uses electric power and water to generate hydrogen gas and purified water.

According to an illustrative embodiment, hydrogen is produced by a hydrogen generator generation system 120, which is described in more detail with regard to FIG. 3. In some embodiments, the hydrogen generator produces hydrogen through electrolysis. In such an embodiment, an electrolyzer 304 receives power 324 from a renewable energy source, as described above. The electrolyzer 304 uses electrolysis, the process by which low voltage electricity is used to break apart a water molecule into hydrogen and oxygen, to make hydrogen using water received from a water source 310 and the electric power 324 received from a renewable energy source. In an embodiment, fresh water electrolysis yields only hydrogen and oxygen, with no other byproducts. The electrolyzer 304 exchanges cooling water 308 with a cooling reservoir 302. And provided hydrogen gas for storage and a hydrogen tank 316. The hydrogen tank 316 may be coupled to a hydrogen storage facility, such as tanks in the hydrogen storage facility 118 of FIG. 1.

In an embodiment, water may be received from a water source 310, which may be a pump or well that may provide water to a reverse osmosis system 306 be a series of valves 312, 314. The valve 312 may be an optional automatic valve on a domestic water source that is controlled by float switches and a storage tank, and a second valve 314 may be a check valve that prevents backflow, which is instead diverted to a backwash pond 318.

An embodiment, the electrolyzer 304 is a utility scale electrolyzer that generate hydrogen. For example, the electrolyzer 304 may be an alkaline electrolyzer capable of producing, for example, 760 normal cubic meters of hydrogen gas an hour at a pressure of up to, for example, 450 PSI (32 bar). In another embodiment, the electrolyzer 304 may be capable of producing, for example, 500 normal cubic meters at pressures of no more than 1 bar. The electrical demand of an electrolyzer 304 that produces approximately 760 normal cubic meters of hydrogen gas an hour at a pressure of up to 450 PSI may be in the range of 4.3 to 4.6 KWh per normal cubic meter of hydrogen produced, while an electrolyzer 304 that produces 500 normal cubic meters at a pressure of 1 bar may use approximately 4.1 to 4.3 KWh per cubic meter of hydrogen produced.

It is noted that water has two uses in the electrolyzer 304. Purified water received from a water storage tank 318, which is purified by a reverse osmosis system 306 may be used as a hydrogen source. In addition, cooling water 308 received from a cooling reservoir 302 is used to cool the electrolyzer 304 to prevent overheating. In an embodiment, the electrolyzers 304 use 40 liters of cooling water per normal cubic meter of hydrogen gas produced. The electrolyzers 304 may also use approximately 0.85 liters of feed water from the peer fight water tank 318 per normal cubic meter of hydrogen produced.

According to an illustrative embodiment, the electrolyzers' cells have an expected life of 10 to 15 operating at full production. In an embodiment in which the electrolyzers 304 are operated an average of 6 to 8 hours per day, the lifespan of the electrolyzers' cells may be tripled.

Hydrogen 322 may be exported from the hydrogen tank 316 to a hydrogen storage system, such as the hydrogen storage system 118 of FIG. 1. Referring again to FIG. 1, the hydrogen storage system 118 includes high pressure storage tanks, which may be pressure vessels rated to 1500 PSI (105 bar). Thus, prior to entering the high pressure vessels of the hydrogen storage system 118, the pressure of the hydrogen may be raised from, for example, 450 PSI (32 bar) to 1500 PSI (105 bar), to maximize use of the storage tanks by minimizing the needed storage volume. Sizing the hydrogen storage system 118 may be a function of weather and electrical demand. For example, using weather data, (in an embodiment in which the renewable energy source is a solar array) we may determine the 100 year maximum of consecutive cloudy days, which is the number of days that hydrogen would be used to run the gas turbine facility on a 24 hour basis while the solar field is non-functional. In such an embodiment, the hydrogen storage system 118 may be sized to store the amount of hydrogen needed to power the gas turbine facility 116 for the determined maximum number of cloudy days.

An embodiment, high pressure gas lines used in the system 100 will be double walled with hydrogen detection equipment installed to maintain safety. In addition, valves to each tank may include automatic shutoff systems with automatic pressure loss sensors to isolate any tank that might develop a leak.

According to an illustrative embodiment, gas turbines will use hydrogen gas instead natural gas as a fuel to function as gas turbine power generators 116. Studies have already been done using hydrogen as a gas turbine fuel with Siemens gas turbines. The report in the Journal of Engineering for Gas Turbines and power, January 2005 Vol. 127 titled "Using Hydrogen as Gas Turbine Fuel", which is herein incorporated by reference, indicates that the Siemens turbines will compensate for hydrogen as a fuel with only minor adjustments. While Siemens is discussed by way of example, any Gas Turbine that is capable of burning hydrogen will work.

Turbine sizing may be determined by overall energy demand with a projected minimum size demand of, for example, 20 MWh. There may be virtually no limit on demand, however, as multiple large turbines can be used in parallel. Gas turbines having output capacities of, for example, up to 300 MW or more may be used.

In an embodiment, the gas turbines are part of a cogeneration system 116, which is an illustrative system for converting the hydrogen gas to electric power. As such, it is noted that any suitable mechanism for converting hydrogen gas to electric power may be used. An illustrative cogeneration system is described with regard to FIG. 2.

Figure 2:
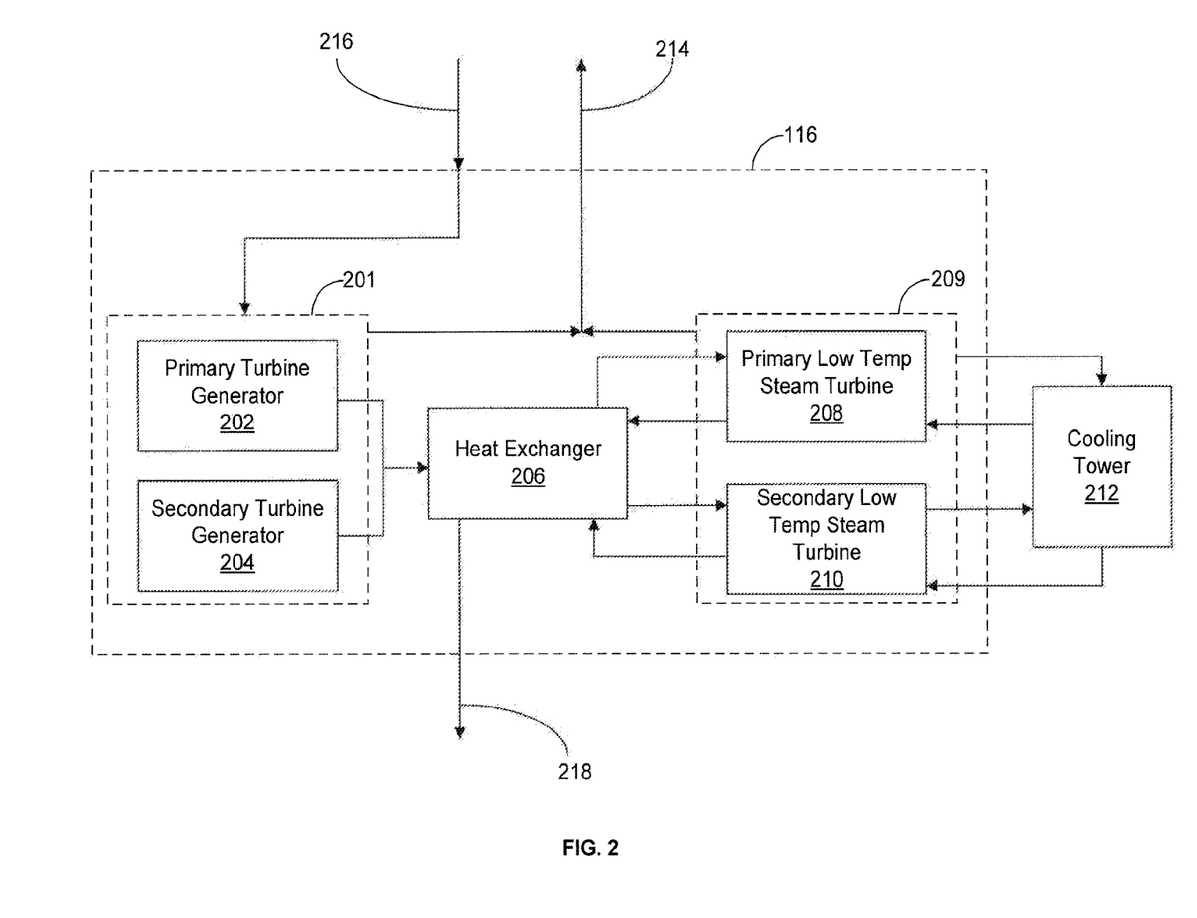
FIG. 2 is a block diagram showing a cogeneration system that uses gas turbines to generate electric power.

According to an illustrative embodiment, the co-generation system 116 includes one or more gas turbines 201, such as primary turbine generator 202 and secondary turbine generator 204. The gas turbines 201 receive hydrogen 216 from a hydrogen storage facility and convert the hydrogen to electric energy 214 that may be provided to the grid in addition to heated exhaust that may be provided to a heat exchanger 206 to facilitate the recovery of additional energy. The size and type of the co-generation system 116 used is determined by the heat rate of the gas turbine(s) being used. For example, on smaller installations, low temperature steam turbines 209, including primarily temperature steam turbine 208 and secondary low temperature steam turbine 210, which may be Pratt & Whitney Turboden generators that recover exhaust through heat exchangers 206 and provide up to an additional, for example, 12 MW per unit installed can be used. Depending on the size of the gas turbines 201, multiple units may be attached to each gas turbine. The steam turbines 209 and be coupled to a cooling tower 212 to enhance energy recovery. Larger installations can use a high pressure steam turbine as a cogeneration unit. Water vapor that is recovered from the gas turbine system may be recovered and repurposed for provision to the community as, for example, irrigation water or as a potable water source.

NOX emissions in such a system may be verified to be approximately, for example, 40 PPM or less when using hydrogen as a fuel. This level NOX emissions may not be a significant factor but in the event that the turbine chosen has significant NOX emissions, a NOX scrubber plant can be constructed to reduce NOX emissions to an acceptable level.

In another embodiment, it the gas turbine generators may be replaced by fuel cells. Such fuel cells may generally include an anode, a cathode, and an electrolyte that are constructed to allow charges to move between opposing sides of the fuel cell. The migration of charged particles results in a chemical decomposition of the fuel and functions as a mechanism for extracting chemical energy to produce electricity. Any suitable fuel cell may be used in such an embodiment, including, for example, a proton exchange membrane fuel cell (PEMFC), an alkaline electrolyzer, a phosphoric acid fuel cell, a solid oxide fuel cell, a molten carbonate fuel cell, a tubular solid oxide fuel cell. In an embodiment, the fuel cell may customized for utility scale electricity production.

Referring again to FIG. 1, according to an illustrative embodiment, a control room 106 includes a control system were switching room that is responsible for day to day plant operation, including internal plant electricity distribution; electricity distribution to grid and or end user; hydrogen production and hydrogen storage; gas turbine operation; reverse osmosis system operation; and safety monitoring and cooling system monitoring. In an illustrative embodiment, the control room 106 includes a control system that implements an automated process for activating and deactivating the systems described. For example, the control system may determine that the maximum amount of hydrogen has been stored, and divert all energy produced by the renewable energy source 102 to the grid 110 until it becomes necessary to generate electricity using hydrogen. In another embodiment, the control system may balance operation of the gas turbine generator with output of the renewable energy power source to level-load power output to an end user or the grid. In another embodiment, the control system may determine that the amount of stored hydrogen is equal to a predetermined amount that corresponds to the expected amount of hydrogen needed for a particular time of year (for example, less hydrogen storage may be necessary at the beginning of the summer then at the end of the summer or the fall when cloudy days are expected in the near future). In such an embodiment, once the expected amount of hydrogen is stored, the control system may divert all additional energy produced by the renewable energy source 102 to the grid 110 until it becomes necessary to generate electricity using hydrogen again. Similar processes may be invoked for wind and tidal systems, which may be optimized based on forecasted amounts of wind and lunar cycles that affect the magnitude of tidal sea level changes. Thus, in an illustrative embodiment, the control room 106 performs automated or near-automated control and monitoring of the systems and processes described herein.

Referring again to FIG. 3, an illustrative embodiment three methods of cooling may be used for cooling the electrolyzers 304 and hydrogen compression: cooling towers, chillers, and cooling ponds. Each system may be selected for site specific rationale in consideration of, for example, temperature, humidity and water availability. Cooling towers may be the most efficient but use large amounts of water and may only reach peak efficiency in arid climates. Chillers have a minimal water usage guidelines but use a noticeable amount of electricity and therefore may be more suitable for high wind/solar, low water climates. A cooling pond uses no electricity and can be designed to provide potential ecological benefits to the area it is installed in, but is not typically as efficient as a cooling tower. A cooling pond, however, may also be selected to minimize capital costs.

The following portion of the description describes the operation of an illustrative embodiment of the system in which the renewable energy source 102 is a solar field. According to the illustrative embodiment, during daytime operation, power from the solar field is collected at a solar substation where voltage is increased in preparation for distribution. The facility control room 106 may determine where power is needed in the 100. In the event that there is excess power from the solar field, it may be sold to the grid 110. The control room 106 determines which elements of the system 100 are currently active, ad each system element can be separately activated and run independently by the control room 106. Based on the determination of the control room 106, power for each subsystem is then routed from the solar substation to the active system facilities.

According to an illustrative embodiment, hydrogen production begins with the water produced by the reverse osmosis system 306, which may also be referred to as a reverse osmosis plant. In the embodiment, non-treated water is pumped to primary storage for use in the reverse osmosis plant 306. In the event domestic water is used, all fluorine and chlorine are removed prior to use in the reverse osmosis facility to avoid damaging the membranes. Two days of reserve non-treated water may be stored in the event of an interruption in water supply. After treatment in the reverse osmosis facility, the water is pumped to secondary storage. Two days of secondary storage may also be maintained. All storage is maintained automatically by the control room via float systems in the storage tanks. Water to be used by the electrolyzers is routed via automatic valves operated by the control room. As part of the electroloysis process, cooling water is supplied at a rate of, for example, 40 liters per normal cubic meter of hydrogen gas produced or 0.3 gallons per normal cubic foot of hydrogen gas produced. As with the feed water, cooling water may also be activated via automatic valves and a pump system. Cooling water is circulated through the electrolyzers 304 and routed through a cooling process that reduces cooling water temperature by, for example, 36 degrees Fahrenheit. According to an illustrative embodiment, a cooling pond is chosen as a cooling reservoir 302 in favor of chillers or cooling towers to minimize costs. The cooling pond may be designed to be functional as well ecological. In an embodiment, a pond of 16 acres with a depth of six feet would be sufficient for all cooling needs. This calculation is based on an ambient temperature of 85 degrees with 20 percent average relative humidity. Water circulation through the electrolyzers 304 occurs only during hydrogen production. During summer months, it is noted that the electrolyzers 304 may only operate for 8 hours a day due to decreased demand, thereby lowering cooling requirements relative to the cooling reservoir 302 during the hottest times of the year.

The electrolysis process may yield only hydrogen and oxygen with no other byproducts. Hydrogen produced may have a purity of 99.8% and thus need no further refinement to be used as a fuel by the gas turbine generators 116. Oxygen produced by the electrolyzers 304 has a similar purity and may also be stored and marketed if not it is released back into the atmosphere. In an embodiment, the hydrogen is compressed in the electrolyzer, which may be a high-pressure electrolyzer that compresses the produced hydrogen to, for example, 450 PSI (32 bar) for storage. The compressed hydrogen may then be transported to the hydrogen storage area where it may be further compressed for more efficient storage. In an embodiment, prior to entering storage tanks, the pressure of the hydrogen gas is increased to 1500 PSI (105 bar) in preparation for storage. The storage field may include multiple high pressure gas storage tanks isolated from each other and connected by a valved header system. The valved header system allows the control room to pressurize each tank individually and monitor the pressure in all tanks constantly. As noted above, all high pressure piping may be double walled with hydrogen gas sensors between walls to detect any leaks. In critical areas parallel system of piping may be installed to ensure safe and continuous plant operations. The overall size of the hydrogen storage field may be determined by weather and demand, as noted previously.

According to an illustrative embodiment, hydrogen from the storage tanks is routed to the gas turbines to produce electricity when the renewable source 102 is not sufficiently productive. Hydrogen may be drawn from any tank. A master control valve regulated by the control room 106 may determine when gas is allowed to flow to the turbines 116. The Gas turbines 116 utilize hydrogen gas at approximately, for example, 400 PSI (30 bar). To facilitate this decrease in pressure from the storage pressure, a regulator and pump system are inserted between the hydrogen storage 118 and the gas turbines 116 to maintain the appropriate constant pressure to the turbines 116. The regulator reduces the pressure to, for example, 400 PSI (30 bar) in the event that the stored gas pressure is higher. When the storage tank pressure is lower than 400 PSI (30 bar), an additional compression pump is used to maintain operating pressures. Each turbine has its own automatic valve system to allow independent operation controlled by the control room 106. Turbine operation only occurs when the solar field or other renewable source 102 is inactive due to night or weather. Correspondingly, hydrogen production only occurs while the solar field or other renewable source 102 is active and therefore generally does not occur when the turbines are active.

According to an illustrative embodiment, the turbines operate in the same manner as a jet engine. Fuel is burned in a combustion chamber. Gas rapidly undergoes thermal expansion, greatly increasing the pressure. The exhaust gases are used to turn a multiple bladed turbine that creates rotational kinetic energy. The rotational energy is transferred through a drive shaft to an electrical generator. The excess heat from the exhaust gasses is captured and sent to a heat exchanger for use in the co-generation turbines. In a case study, a turbine produces 289.9 pounds per second of exhaust at 1011 degrees F.

According to an illustrative embodiment, the co-generation turbines operate by using a thermal oil in a closed hydraulic system to generate additional rotational energy that is captured by all electrical generator. The combined energy from both generators is collected at an electrical sub-station where it is prepared for distribution to the end user production facility 114 or grid 110.

Figure 4:
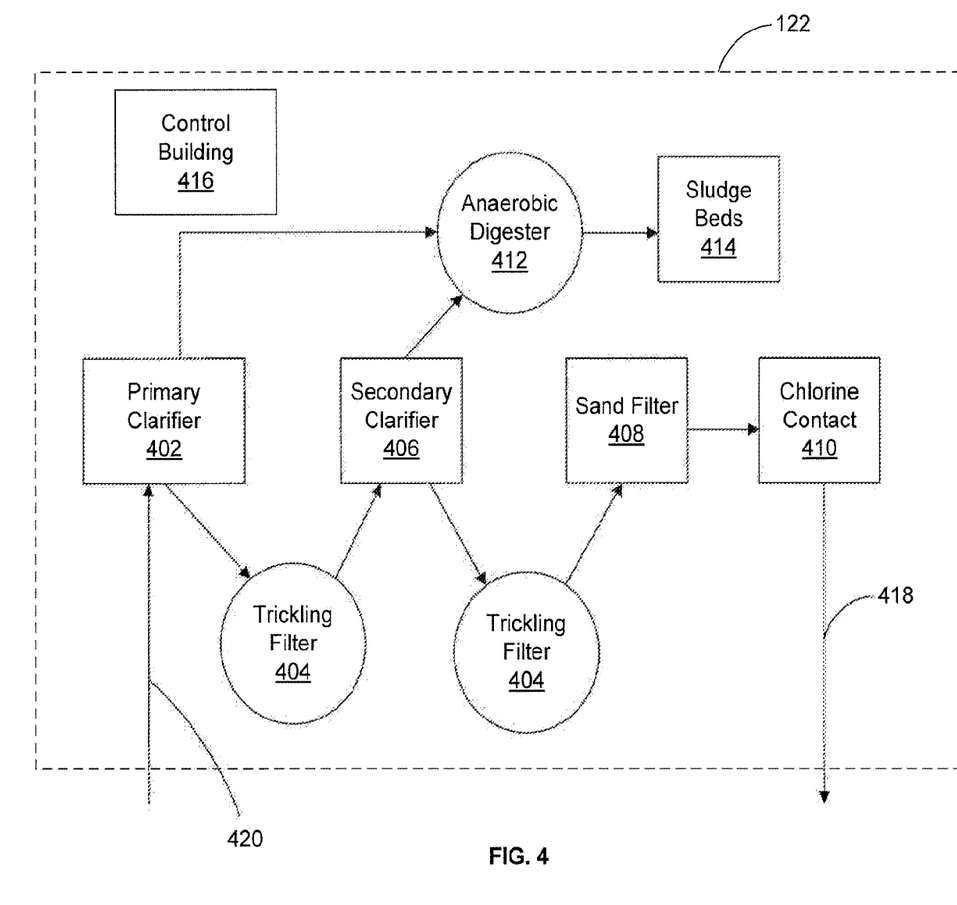
FIG. 4 is a block diagram showing a water treatment system that operates in conjunction with the aforementioned systems.

As shown in FIG. 1, an illustrative system 100 that applies the above described process may also include a water treatment system 122. This facility is optional and decreases the demand for water while also providing another service to the community proximate the system 100. As described with regard to FIG. 4, such a water treatment system 122 may include a control building 416 that controls and powers the water treatment process. As such, the control building 416 may receive power from the renewable energy source 102 or gas generators 116 of FIG. 1. The water treatment system 122 may receive wastewater 420 that is supplied to the primary clarifier 402. The water is routed through a series of a primary clarifier 402, trickling filter 404, secondary clarifier 406, trickling filter 404, sand filter 408, and a chlorine contact filter 410, at which point the treated water 418 is suitable for transmission to the hydrogen production system 120 where it may be further purified and used for feed water. Particulate may be extracted from the wastewater 420 from the primary clarifier 402 and secondary clarifier 406. The particulate may be diverted to an anaerobic digester 412 and subsequently to sludge beds the 414 that may ultimately be harvested to produce fertilizer, thereby providing an additional resource to the community.

Referring again to FIG. 1, it is noted that the systems and processes described above may be executed in accordance with a suitable methodology. For example, according to an illustrative embodiment, a solar-hydrogen (or renewable energy-hydrogen) cycle may be considered a method by which alternative green energy can provide 24 hour power 365 days a year to a specific user or to the grid 110. The system 100 uses a renewable source 102 to produce hydrogen gas that will operate gas turbines 116 when the renewable source is inactive. Renewable source 102 and plant design is site specific and depends upon the amount of production of the renewable source 102, the type and amount of water available, the location of the grid 110 and interconnect, and the minimum amount of continuous 24 hour power to be produced.

According to an illustrative embodiment, the system 102 operates with the renewable source 102 providing power for water purification, hydrogen production, hydrogen storage, and other plant processes as well as providing the continuous power to be generated to the end user or the grid 110. Therefore, the renewable source 102 may be sized to produce enough power to produce hydrogen during that portion of the year when the renewable source's 102 productivity is lowest. For modeling purposes the "average renewable day" for every month may be determined. During the shortest "average renewable day" of the year, hydrogen production is slightly more than is needed to operate the gas turbines during the projected renewable energy source downtime. The excess hydrogen is sent to a storage facility 118 for use when the renewable energy source 102 is inactive. Storage volumes are determined by evaluating frequency that the renewable energy source is non-productive during the shortest "average renewable day". A safety factor, for example, may be applied to the average expected downtime of the renewable energy source.

According to an illustrative embodiment, the hydrogen demand is determined by the amount of power needed to maintain "stated plant output" while the renewable energy source is non-operational. The time (expressed by T), the solar field may be non-operational is determined by subtracting the "average renewable day" of any given month from 24 hours. As referenced herein, the average renewable day is the average number of hours per day in a given month that the renewable energy source produces renewable energy. Power is produced during down time of the renewable energy source 102 by the gas turbines 116, which burn hydrogen to produce power. The amount of hydrogen used by the turbines as fuel is determined by the heat rate of the turbine. This number is expressed in BTUs per KWh and varies from generator to generator. To determine the total number of BTUs used to operate the gas turbine (TH) the equation, $HR \times T = TH$ is used. Here, HR is the heat rate, T is time, and TH is the total heat in BTUs. The power from the co-generation units, however, may also be taken into consideration. To do this, the equation $TH/TP = RHR$, where TH is the total heat from the gas turbines in BTUs, TP is total power produced by both the gas turbine and the co-generation system, and RHR is the revised heat rate. The revised heat rate is multiplied by the LHV of a normal cubic foot of hydrogen gas to determine the amount in normal cubic feet hydrogen needed to produce a KWh of power. Here, LHV is defined as "lesser heating value," which is the amount of heat that burning a compound (such as hydrogen) will yield. This number is multiplied by the "stated plant output" and T to determine the average hydrogen demand per day for the given month.

In an embodiment, the renewable power source size is determined by the amount of power necessary to produce the hydrogen through the electrolysis process. In the case of a suitable solar panel type, for example, the electrical demand is given as, for example, 4.3 to 4.65 KWh per normal cubic meter of hydrogen. Here, it is necessary to convert normal cubic meters to normal cubic feet, which is done by multiplying by a factor of 35.31. A result of 4.3 to 4.65 KWH per 35.31 normal cubic feet is obtained, which simplifies to a result of 8.21 to 7.59 normal cubic feet per KWh. The more conservative number of 7.59 normal cubic feet per KWh may be chosen when determining the power demand to generate hydrogen. Thus, the number of cubic feet of hydrogen used on an average day in a given month may be multiplied by the 7.59 KWh per cubic foot to determine an average daily power requirement per month for the solar field to generate. The field may be sized to the highest average daily hydrogen power used plus this demand for "stated plant output".

According to an illustrative embodiment, water requirements are based on hydrogen demand and cooling requirements. As stated above, exemplary electrolyzers use 0.85 liters of feed water per normal cubic meter of hydrogen produced. Converting to the English scale yields 6.36 gallons per 1000 normal cubic feet of hydrogen. A feed water usage guideline is then derived by dividing 6.36 gallons per 1000 normal cubic feet of hydrogen into the average daily hydrogen demand. Other suitable electrolyzers use, for example, 40 liters per normal cubic meter of cooling water, or about 0.3 gallons per normal cubic foot of hydrogen produced. This water is cooled by 38 degrees Fahrenheit. In an embodiment, a cooling pond is used that primarily functions by using evaporation as a cooling method. The water to be used from the pond is determined by series of equations which can be found in "Surface Heat Loss From Cooling Ponds" by Ryan, Harleman, and Stolzenbach (Water Resources Research, Jul. 9, 2010), which is herein incorporated by reference. The total daily water usage need is the pond make up water plus the hydrogen electrolyzer feed water.

As described previously, the control room is responsible for ensuring day to day plant operations and for executing computer programs that may provide automatic functioning of the related systems. According to an illustrative embodiment, a single unified program automates all or a portion of the process. The program may accommodate operation when the renewable power source is active and when it is non-functional. During daytime operation, the control room monitors power produced from the renewable energy source, the control room distributes power from the renewable energy source 102 internally and potentially to the grid 110, monitors cooling temperatures, regulate hydrogen production, and controls hydrogen gas distribution into the storage facilities as well as all safety monitoring to ensure that there are no hydrogen leaks.

According to an illustrative embodiment, if the renewable source is solar, daytime operation may begin at daybreak when the solar field first starts to receive sunlight and produce power. The control room may automatically recognize the power increase from the solar field and begin the shutdown process for the gas turbines. Until the solar field has reached "stated plant output" the gas turbines may remain online. After "stated plant output" has been reached by the solar field commands are sent to from the control system to the hydrogen generator 120 to begin hydrogen production. The hydrogen production process begins by simultaneously opening cooling and feed water valves and activating the pumps associated with those functions. As power from the solar field 102 continues to increase and drawdown on stored processed fresh water begins, the control room initiates reverse osmosis facility operations. All water storage tanks will be equipped with a float system that will monitor storage volume. Reverse osmosis will continue until the storage tanks are full or there is insufficient power from the solar field to continue operations. If domestic water production is desired, the plant can be optimized to run the reverse osmosis plant continuously to provide water.

In the event of interruption of power production on the solar field due to partly cloudy weather, the control room software recognizes the rate of decline and percent of total field output loss. At a certain point, the rate of decline and the limited remaining production will trigger gas turbine start up to compensate for the loss of solar production. The plant operator has the ability override the computer system in such an event. In the event of continued intermittent loss of solar production, the plant operator has the ability to override software protocol and maintain gas turbine production to prevent an excessive number of and shutdowns of the gas turbines, though in an embodiment, the system may also determine if the number of startups and shut downs is excessive, and keep the turbines operational or implement a more conservative criteria (such as waiting for a sustained period of renewable energy output) before stopping the turbines. In an embodiment, the operator may be aware, or the control system may be made aware, of weather events that would cause a rapid decline in solar production compensating for that condition by initiating gas turbine start up prior to loss of solar production. It is noted that the spin up time for most many turbines is 6 to 8 minutes.

As noted above, the concepts described above may also be applied in a power plant using wind energy, hydro-power, geo-thermal power, or any other suitable power source in place of solar energy. As such, if the renewable source is wind, then the control room may constantly monitor power production from the wind farm, and supplement any loss of production with power from the Gas Turbines.

An economic methodology may also be applied in the configuration of the system 100. According to an illustrative embodiment, the economic model is based on an assumed 30 year plant life. Total costs are determined by adding the costs of all of the component parts of the plant. The cost of the renewable power source may be determined by the total number of generating units to be installed. The total number of generating units to be installed is determined by the output of each panel divvied into the total output needed. As an example, certain CPV solar panels produce 30 KWh in direct sunlight, and therefore a plant requiring 5 megawatts of solar power would need 167 solar panels. Each such panel may cost $80,000 to produce and $10,000 to install, though prices may be flexible and larger orders may receive a price break.

According to an illustrative embodiment, the cost of the gas turbines is determined by the number and model of the turbines used. A Siemens SGT-800 turbine, for example, may cost 25 million dollars installed. According to an illustrative embodiment, the cost of cogeneration turbines will also be based on number and type used. If, for example, Pratt & Whitney Turboden co-generation turbines are used, each unit will have an installed cost of 17 million dollars.

According to an illustrative embodiment, a reverse osmosis plant has a fixed cost of $2.72 per 1000 gallons, including maintenance. The fixed cost is simply multiplied by the number of gallons per day needed to determine an overall cost for the facility to determine total cost. Storage may be considered variable and may be determined based on the amount of storage deemed necessary. For example, an assumed average hydrogen storage cost of $0.07 per cubic foot of hydrogen and $1.00 per gallon of water can be used to derive costs. The cost of the electrolyzers may be dependent on the demand for hydrogen production. The National Renewable Energy Lab Report from September 2009, for example, estimated a cost of $800 per kilogram per day for hydrogen production. The estimated cost may be adjusted to reflect down time, and in an embodiment in which the electrolyzers are only expected to be active for half a day, the estimate may be doubled to $1600 per kilogram to reflect the expected non-productive time. The balance of system costs includes yard piping, the control room systems (including associated hardware and software), and facility buildings. The yard piping is site specific but an estimated 150 dollars per lineal foot can be assumed which includes pumps and valves. The control room will consist of a robust computer system to monitor and control plant operations. This system including software is roughly estimated to cost 2.5 million dollars. The facility buildings are estimated to cost $150 per square foot which includes all internal machinery and piping.

Applying the foregoing assumptions, three separate economic models describe the potential income of the plant. The first is a model where the end user and grid prices differ. In this model the end user receives a price break on the demanded continuous power and all other excess power is sold to the grid at a constant rate. The second model has no distinction between grid price and end user price. This model can also be represented as a straight sale to the grid. The last model type is a stand-alone model where no excess power generated by the solar field is sold. This model represents no grid connectivity and a fixed continuous demand.

Three economic case studies are presented below. Each case study has following in common assumptions: location; overall continuous power demand; solar field size; plant equipment; hydrogen demand; and storage field size. The only differences between the first three studies are the method and price of sales, all capital costs remain constant. All models assume a continuous power demand of 55 MW, with a solar field size of 450 MW. Each model also uses weather conditions from El Paso, Tex. as reported by NOAA. Due to El Paso's weather and location much more solar energy is produced during the summer. This decreases total turbine demand noticeable in those months. The following graph shows power generation potential. Total capital costs for all models are 1.494 billion dollars. Lifetime maintenance costs of just over 100 million dollars are projected, bringing the lifetime plant cost to 1.597 billion dollars.

Model 1—End User with Grid: The first model sells power to an end user at the rate of $0.06 per KWh and any excess power is sold to the grid at a rate of $0.075. In this model 604,000 MW of excess solar are sold to the grid in an average year, while 482,000 MW are sold to the end user. This results in $45,334,180 a year in excess solar sales and $28,908,000 a year from hydrogen plant sales. The income is not distributed evenly over the year as the majority of excess solar sales come from May to August. The plant produces a total of 35.58 million megawatts over its lifespan with a total cost of 1.597 billion dollars this yields a $0.0490 cost per KW well within conventional generating costs.

Model 2—Grid Only: The second model assumes that a local utility is buying all power produced at one fixed rate. In this model the power produced from the hydrogen plant as well as any excess solar power from the field is sold at a constant $0.075 per KWh. The amount of power generated by the plant and the solar field remain the same as the size of both remains unchanged. A total of 32,587,672 MW are produced over the plant life yielding a total income of 2.44 billion dollars. As with model 1 profits are not evenly distrusted over the course of a year following the same pattern as Model 1. Price per KWh also remains constant with Model 1 at $0.049 per KWh Model 2 is slightly more profitable than model one due to the increased 0.015 increase in sales from the energy produced in the hydrogen plant. Models 2 yield a projected total profit of $846,106,000 or a 52% return on initial investment.

Model 3—International Pricing: Model 3 is a variation on Model 2. The only difference is the sale price of the power. Model 3 is designed to reflect an international sales rate. Energy rates outside of the United States vary from $0.20 to $0.50. We estimated a conservative sale cost of $0.15 per kw in this model. All other factors including the weather for El Paso, Tex. remain the same. As with Models 1 and 2 income varies from month to month at the rate described in Model 1. Total projected income per year is $162,938,000. Approximately 90 million is from excess solar production, while 72 million is from hydrogen plant production. A lifetime 3.29 billion dollars in total revenues is expected over the 30 year plant life. This is a 220% return on investment.

Model 4—Stand-alone: The standalone model differs from the other 3 models in that the solar field has been sized to the absolute minimum to provide enough hydrogen production for the shortest "average solar day" In this case 401 MW versus the 450 the other models had. Without excess solar power sell back efficiency may be maximized and capital costs reduced as much as possible. This model is only suited for area with no grid connectivity and assumes no excess power will be bought during daylight hours. It is entirely possible that depending on site locations that some excess power maybe sold however it is impossible to model without a detailed use analysis report.

The total cost for the plant comes in at 1.363 billion dollars as opposed to 1.597 billion dollars for all other case studies. This is a total of a 14.6% savings and brings the standalone cost down to $0A009 per KWh. Sale price for the model is set at $0.125 which yields a total income of 1.806 billion dollars and a projected profit of 348 million dollars.

It will be understood that the benefits and advantages described above may relate to one embodiment or may relate to several embodiments of the invention. It will further be understood that reference to "an" item refers to one or more of those items.

What is claimed:

1. A system for providing electric power to a commercial military or industrial user, the system comprising:
   a renewable energy power generator;
   a hydrogen generator electrically coupled to the renewable energy power generator;
   a water source coupled to the hydrogen generator to supply water to the hydrogen generator;
   a hydrogen fueled turbine generator coupled to the hydrogen generator;
   a hydrogen storage system fluidly coupled to the hydrogen generator and the hydrogen fueled turbine generator; and
   a control system communicatively coupled to the renewable energy power generator, the water source, the hydrogen generator and the hydrogen fueled turbine generator;
   wherein the control system controls the hydrogen fueled turbine generator to produce at least a portion of the electric power when the renewable energy power generator is unable to produce the at least a portion of the electric power.

2. The system of claim 1, wherein the renewable energy power generator is selected from the group consisting of a solar panel array, a wind farm, and a tidal hydroelectric power generator.

3. The system of claim 1, wherein the hydrogen fueled turbine generator comprises a cogeneration system having a primary hydrogen fueled turbine generator, a heat exchanger, and a steam fueled turbine generator.

4. The system of claim 1, wherein the hydrogen fueled turbine generator comprises a fuel cell.

5. The system of claim 1, wherein the hydrogen generator comprises a hydrogen generation subsystem having a utility-scale electrolyzer and a compressor for pressurizing hydrogen gas produced by the utility-scale electrolyzer.

6. The system of claim 5, wherein the hydrogen generation subsystem has a reverse osmosis subsystem for receiving unpurified water and providing purified water to the utility-scale electrolyzer.

7. The system of claim 1, wherein:
the control system is operable to determine whether the renewable energy power generator outputs a power above a predetermined power output threshold;
the control system is operable to determine whether the hydrogen storage system stores an amount of hydrogen above a predetermined hydrogen threshold;
the control system is operable to divert power from the renewable energy power generator to a power grid when the power output from the renewable energy power generator is above the predetermined power output threshold and the amount of stored hydrogen in the hydrogen storage system is above the predetermined hydrogen threshold; and
the control system is operable to start the hydrogen fueled turbine generator when the power output from the renewable energy power generator is less than the predetermined power output threshold.

8. The system of claim 7, wherein the control system is operable to stop operation of the hydrogen fueled turbine generator when the power output from the renewable energy power generator is greater than the predetermined power output threshold.

9. The system of claim 8, wherein:
the control system is operable to determine whether a rate of change of the power output from the renewable energy power generator is below a predetermined rate of change; and
the control system is operable to stop operation of the hydrogen fueled turbine generator when a rate of change of the power output from the renewable energy power generator is below a predetermined rate of change threshold.

10. The system of claim 1, wherein:
the control system is operable to indicate to a user whether the renewable energy power generator outputs a power above a predetermined power output threshold;
the control system is operable to indicate to the user whether an amount of stored hydrogen in the hydrogen storage system is above a predetermined hydrogen threshold;
the control system is operable to divert the power output from the renewable energy power generator to a power grid in response to an initiated signal of the user; and
the control system is operable to start the hydrogen fueled turbine generator in response to another initiated signal of the user.

11. A process for continuously generating electric power for provision to a commercial military or industrial user, the process comprising:
using a renewable energy power generator to generate at least a portion of the electric power, from a renewable energy power source connected to the renewable energy power generator;
providing at least a portion of the electric power from the renewable energy power source to a hydrogen generator connected to the renewable energy power generator;
supplying a water to the hydrogen generator from a water source connected to the hydrogen generator;
generating a hydrogen gas by the hydrogen generator from the water using an electrolysis process;
storing the hydrogen gas in a hydrogen storage system connected to the hydrogen generator;
using at least a portion of the hydrogen gas to fuel a hydrogen fueled turbine generator connected to the hydrogen storage system;
generating at least a portion of the electric power by the hydrogen fueled turbine generator; and
controlling by a control system the water source, the hydrogen generator, the hydrogen storage system, and the hydrogen fueled turbine generator responsive to the at least a portion of the electric power from the renewable energy power source below a threshold.

12. The process of claim 11 comprising using a control system for controlling to initiate the providing at least a portion of the electric power from the renewable energy power source to the hydrogen generator.

13. The process of claim 11, wherein using the renewable energy power generator comprises:
using at least one of a solar power generator, a wind power generator, a geo-thermal power generator, and a hydro-power generator.

14. The process of claim 11, wherein using the at least a portion of the hydrogen gas comprises:
using a cogeneration system to generate the at least a portion of the electric power, the cogeneration system having a gas turbine generator, a heat exchanger, and a low temperature steam turbine generator.

15. The process of claim 11, wherein using the at least a portion of the hydrogen gas further comprises using a fuel cell to generate the at least a portion of the electric power.

16. The process of claim 11, further comprising:
determining whether the at least a portion of the electric power from the renewable energy power generator is above a predetermined power output threshold;
determining whether the hydrogen gas in the hydrogen storage system is above a predetermined hydrogen threshold;
diverting power from the renewable energy power generator to a power grid when the at least a portion of the electric power from the renewable energy power generator is above the predetermined power output threshold and the hydrogen gas in the hydrogen storage system is above the predetermined hydrogen threshold; and
initiating the step of using at least a portion of the hydrogen gas in the hydrogen storage system to generate at least another portion of the electric power when the at least a portion of the electric power from the renewable energy power generator is less than the predetermined power output threshold.

17. The process of claim 11, further comprising:
indicating to a user whether the at least a portion of the electric power from the renewable energy power generator is above a predetermined power output threshold;
indicating to the user whether an amount of the hydrogen gas in the hydrogen storage system is above a predetermined hydrogen threshold;
receiving a first user-generated command to divert the at least a portion of the electric power from the renewable energy power generator to a power grid;
diverting the at least a portion of the electric power from the renewable energy power generator to the power grid in response to receiving the first user-generated command;
receiving a second user-generated command to initiate the step of using the at least a portion of the hydrogen gas to generate the at least a portion of the electric power by the hydrogen fueled turbine generator; and
initiating the step of using the at least a portion of the hydrogen gas to generate the at least a portion of the electric power from the hydrogen fueled turbine generator, in response to receiving the second user-generated command.

18. The process of claim 11, wherein generating the hydrogen gas from the water employs an electrolysis process using another at least a portion of the electric power from the renewable energy power generator; and further comprising:
compressing the hydrogen gas from the electrolysis process to a pressure of more than 400 psi; and
storing the hydrogen gas from compressing.

19. The process of claim 11, wherein generating the hydrogen gas from the water employing an electrolysis process further comprises:
using a reverse osmosis system to purify the water; and
providing the water from the reverse osmosis system to an electrolyzer to produce the hydrogen gas.

* * * * *